(12) United States Patent
Namuduri et al.

(10) Patent No.: US 6,876,177 B2
(45) Date of Patent: Apr. 5, 2005

(54) LOAD DUMP TRANSIENT VOLTAGE CONTROLLER

(75) Inventors: Chandra S. Namuduri, Troy, MI (US); Michael G. Reynolds, Troy, MI (US)

(73) Assignee: General Motors Corporation, Detroit, MI (US)

( * ) Notice: Subject to any disclaimer, the term of this patent is extended or adjusted under 35 U.S.C. 154(b) by 130 days.

(21) Appl. No.: 10/357,970

(22) Filed: Feb. 4, 2003

(65) Prior Publication Data

US 2004/0150375 A1 Aug. 5, 2004

(51) Int. Cl.[7] .............................. H02P 9/30; H02P 9/10; H02J 7/14; H02J 7/10
(52) U.S. Cl. ............................. 322/28; 322/29; 322/59
(58) Field of Search .......................... 322/17, 28–29, 322/59

(56) References Cited

U.S. PATENT DOCUMENTS

| | | | | |
|---|---|---|---|---|
| 3,581,150 A | * | 5/1971 | Kirk et al. ................... 361/18 |
| 3,599,079 A | * | 8/1971 | Ansbro et al. ................ 322/23 |
| 3,612,982 A | * | 10/1971 | Jones et al. .................. 322/28 |
| 3,631,258 A | * | 12/1971 | Eisenstadt .................... 307/64 |
| 3,663,946 A | * | 5/1972 | Iwaki ......................... 322/23 |
| 3,938,005 A | * | 2/1976 | Cummins ..................... 361/21 |
| RE29,475 E | * | 11/1977 | Jensen ........................ 322/28 |
| 4,096,429 A | * | 6/1978 | Carter ........................ 322/28 |
| 4,340,849 A | * | 7/1982 | Kuhn .......................... 322/28 |
| 4,362,982 A | * | 12/1982 | Akita et al. .................. 320/123 |
| 4,401,937 A | * | 8/1983 | Morishita .................... 322/28 |
| 4,453,120 A | * | 6/1984 | Bauer ......................... 322/28 |
| 4,477,766 A | * | 10/1984 | Akita et al. ................... 322/28 |
| 4,599,552 A | * | 7/1986 | Phillips et al. ................ 322/28 |
| 4,623,833 A | * | 11/1986 | Edwards ...................... 322/28 |
| 4,831,322 A | * | 5/1989 | Mashino et al. ............... 322/28 |
| 5,061,889 A | * | 10/1991 | Iwatani et al. ................ 322/28 |
| 5,089,766 A | * | 2/1992 | Iwatani ....................... 322/25 |
| 5,099,189 A | * | 3/1992 | Iwaki et al. ................... 322/25 |
| 5,254,935 A | * | 10/1993 | Vercesi et al. ................ 322/29 |
| 5,319,299 A | * | 6/1994 | Maehara ...................... 322/28 |
| 5,453,901 A | * | 9/1995 | Lackey ........................ 361/21 |
| 5,483,146 A | * | 1/1996 | Schultz et al. ................. 322/7 |
| 5,497,071 A | * | 3/1996 | Iwatani et al. ................ 322/28 |
| 5,512,813 A | * | 4/1996 | Uchinami ..................... 322/28 |
| 5,550,456 A | * | 8/1996 | Shekhawat et al. ............ 322/25 |
| 5,719,485 A | * | 2/1998 | Asada ......................... 322/28 |
| 5,731,689 A | * | 3/1998 | Sato .......................... 322/25 |
| 5,748,463 A | | 5/1998 | Tsutsui et al. ............... 363/127 |
| 5,754,030 A | * | 5/1998 | Maehara et al. ............... 322/19 |
| 5,805,394 A | * | 9/1998 | Glennon ...................... 361/20 |
| 5,880,577 A | * | 3/1999 | Aoyama et al. ............... 322/29 |
| 5,936,440 A | * | 8/1999 | Asada et al. ................ 327/110 |
| 5,982,154 A | * | 11/1999 | Kanazawa et al. ............ 322/29 |
| 5,982,155 A | * | 11/1999 | Rechdan et al. .............. 322/36 |
| 6,037,753 A | | 3/2000 | Uematsu et al. .............. 322/29 |
| 6,046,917 A | * | 4/2000 | Gibbs et al. .................. 363/69 |
| 6,060,866 A | | 5/2000 | Sada et al. ................... 322/59 |
| 6,208,120 B1 | * | 3/2001 | Gibbs ......................... 322/59 |
| 6,462,517 B2 | * | 10/2002 | Asada ......................... 322/28 |
| 6,696,820 B2 | * | 2/2004 | Peter .......................... 322/24 |
| 6,803,748 B2 | * | 10/2004 | Peter .......................... 322/29 |
| 6,815,933 B2 | * | 11/2004 | Taniguchi et al. ............. 322/28 |

* cited by examiner

*Primary Examiner*—Darren Schuberg
*Assistant Examiner*—Pedro J. Cuevas
(74) *Attorney, Agent, or Firm*—Kathryn A. Marra

(57) ABSTRACT

A generator field regulator circuit communicates with a field winding of a Lundell machine and includes a first transistor. A second transistor has a source that communicates with a drain of the first transistor and a drain that communicates with one end of the field winding. A free-wheeling diode communicates with the drain of the first transistor and a source of the second transistor. An overvoltage detection circuit modulates a gate of the second transistor. A pulse width modulation (PWM) circuit modulates a gate of the first transistor to maintain generator rectified voltage at a nominal level. The overvoltage detection circuit outputs an overvoltage shutdown signal to the PWM circuit during a full-load dump mode to turn off the first transistor, which turns off the second transistor. The overvoltage shutdown signal is disabled when a terminal voltage of a generator falls below a predetermined voltage.

20 Claims, 7 Drawing Sheets

LOAD DUMP TRANSIENT VOLTAGE CONTROLLER

FIELD OF THE INVENTION

The present invention relates to electric power generators, and more particularly load dump transient voltage control systems for power generators of vehicles.

BACKGROUND OF THE INVENTION

Vehicles with internal combustion engines typically use a Lundell machine as a primary electrical power source. The Lundell machine provides a rugged and economical solution for electrical power demand in vehicles.

Referring now to FIG. 1, a vehicle electrical generator 10 with a field regulator 14 is shown. The field regulator 14 is also known as a single quadrant chopper because field current and voltage are either positive or zero at any given time. The generator 10 also includes a Lundell alternator 18 (also known as a claw pole alternator), which is a wound-field, 3-phase synchronous machine. The output of the Lundell alternator 18 communicates with a 3-phase avalanche bridge rectifier 22 to produce DC power.

The field regulator 14 generates an error signal based on a difference between a terminal voltage (across B+ and B−) and a reference $V_{ref}$. The field regulator 14 includes a pulse width modulator (PWM) controller 26 that modulates (PWM) a power transistor Q1, which is in series with a field winding 30. A duty cycle of the transistor Q1 depends on a field current that is required to maintain an output voltage at a desired level for a given speed and load condition. Diode DF provides a freewheeling path for the field current when the transistor Q1 is switched off.

Referring now to FIG. 2, a test circuit 40 for evaluating transient performance of the vehicle electrical generator 10 is shown. The generator 10 is connected to battery 44 and a load 48. The battery 44 can be a 42V battery and the generator 10 can be a 42V generator, although other voltage levels are contemplated. Switches $S_g$, $S_b$, and $S_l$ are used for disconnecting the generator 10, the battery 44 and/or the load 48.

In a full load dump, the generator 10 (supplying rated current) is suddenly disconnected from the battery 44 and most of the load 48. The full load dump produces a severe transient on the power bus as is shown in FIGS. 3A and 3B. With a normal rectifier, the peak transient voltage $V_{peak}$ can reach levels several times the nominal generator voltage $V_{nom}$. The transient duration $T_{load\_dump}$ may last several hundred milliseconds prior to dropping below a maximum specified generator voltage $V_{max}$.

Avalanche rectifiers clamp the peak transient generator voltage $V_{peak}$ to acceptable levels by absorbing generator output power until a magnetic field decays to lower levels. A duration of the load dump transient $T_{load-dump}$ is primarily dependent on a field time constant in a single quadrant regulator. The field current decays at its natural rate while freewheeling through the diode DF when the transistor Q1 is turned off due to over-voltage.

The load dump energy absorbed by the avalanche rectifiers in higher power generators may require multiple devices in parallel or much larger devices to assure reliable operation. These devices significantly increase the cost, size and mass of the alternator, which is undesirable for vehicle applications.

SUMMARY OF THE INVENTION

A generator field regulator circuit according to the present invention communicates with a field winding of a Lundell machine and includes a first transistor. A second transistor has a source that communicates with a drain of the first transistor and a drain that communicates with one end of the field winding. A free-wheeling diode communicates with the drain of the first transistor and a source of the second transistor.

In other features, an overvoltage detection circuit modulates a gate of the second transistor. A pulse width modulation (PWM) circuit modulates a gate of the first transistor to maintain generator rectified voltage at a nominal level. The overvoltage detection circuit outputs an overvoltage shutdown signal to the PWM circuit during a full-load dump mode to turn off the first transistor and the second transistor. The overvoltage shutdown signal is disabled when a terminal voltage of a generator falls below a predetermined voltage.

In still other features, first and second diodes communicate with a drain of the second transistor and set a clamp voltage of the second transistor when the overvoltage shutdown signal is enabled.

In yet other features, the generator further includes a Lundell machine that includes the field winding and a 3-phase avalanche rectifier that communicates with the Lundell machine. The gate of the second transistor communicates with a cathode of a third diode and one end of a first capacitor. The third diode and the first capacitor keep the second transistor on during normal operation. The overvoltage shutdown signal exceeds a maximum operating voltage of the generator. The second transistor and the overvoltage detection circuit are maintained at a lower temperature than an ambient temperature of other components of the generator.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
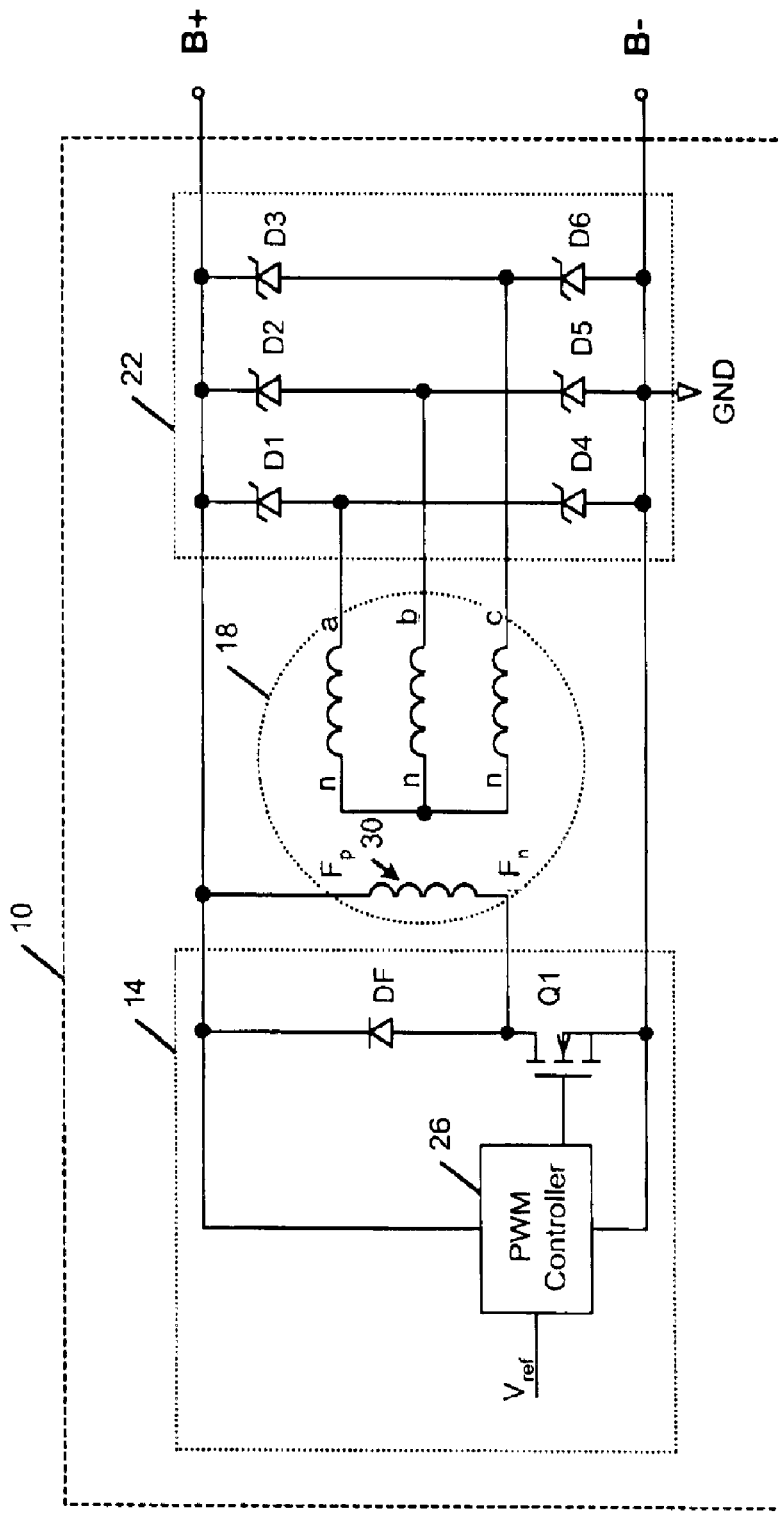
FIG. 1 is a functional block diagram of an electric power generator for a vehicle according to the prior art.
Figure 2:
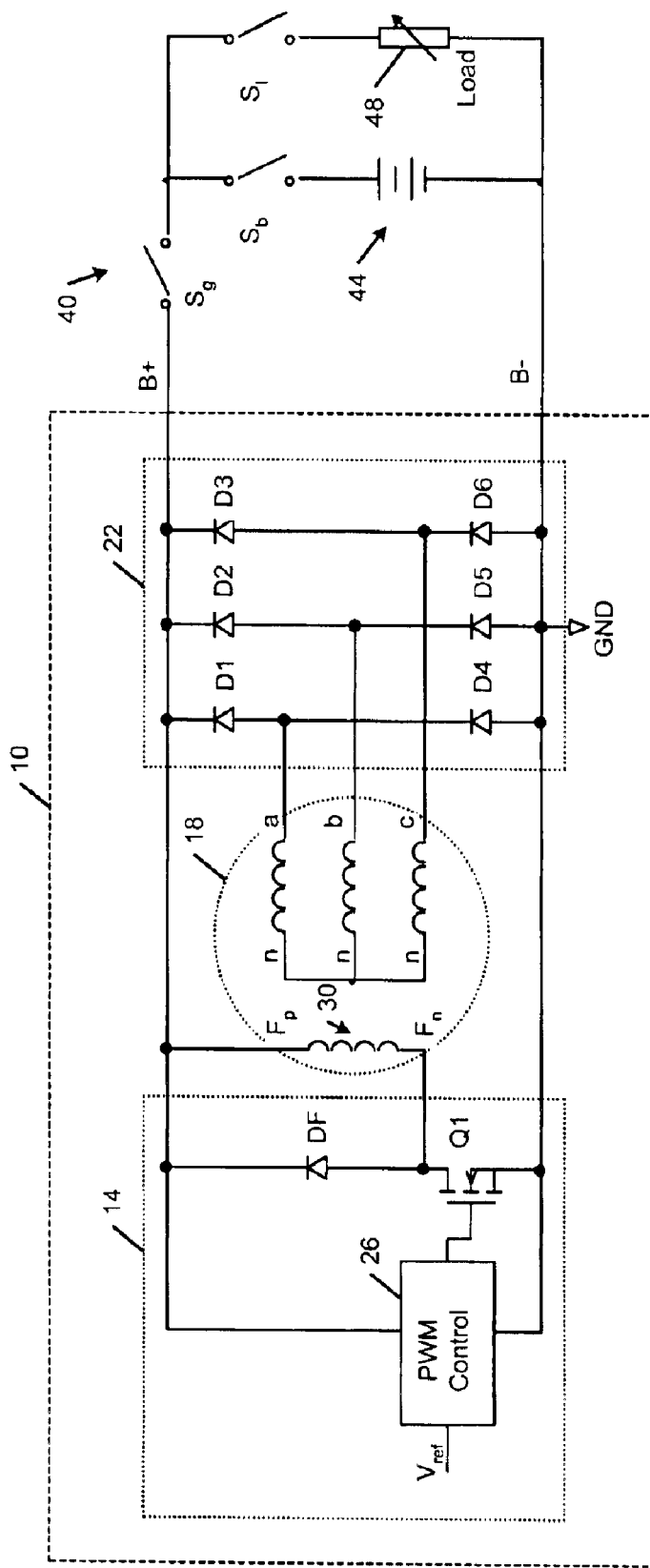
FIG. 2 is a functional block diagram illustrating a test circuit connected to the electric power generator of FIG. 1.
Figure 3A:
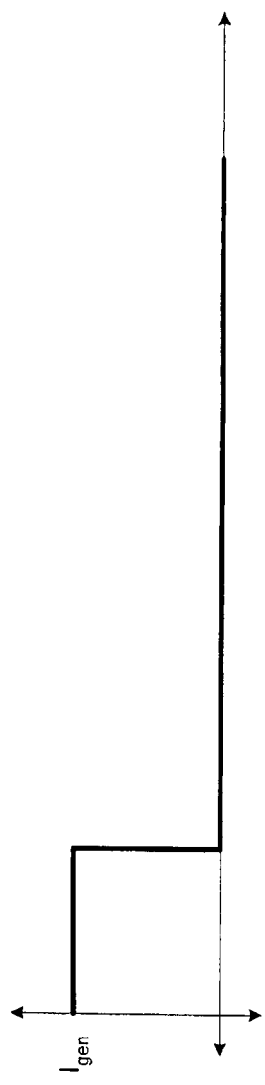
FIGS. 3A and 3B are waveforms illustrating current and voltage, respectively, during a full load dump.
Figure 3B:
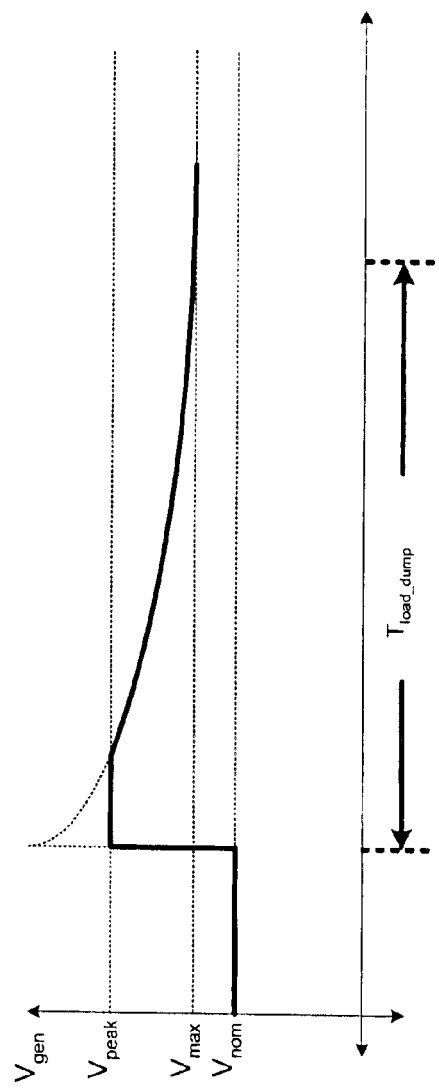

The following description of the preferred embodiment(s) is merely exemplary in nature and is in no way intended to limit the invention, its application, or uses. For purposes of clarity, the same reference numbers will be used in the drawings to identify similar elements.

The present invention provides a control system and method for a generator that achieves fast and efficient control of generator output voltage during load switch-off. The present invention also reduces a duration of a load dump transient $T_{load-dump}$ and dissipated energy during the load dump transient. The present invention also reduces the size of overvoltage transient suppression devices and improves the reliability of the generator.

Figure 4:
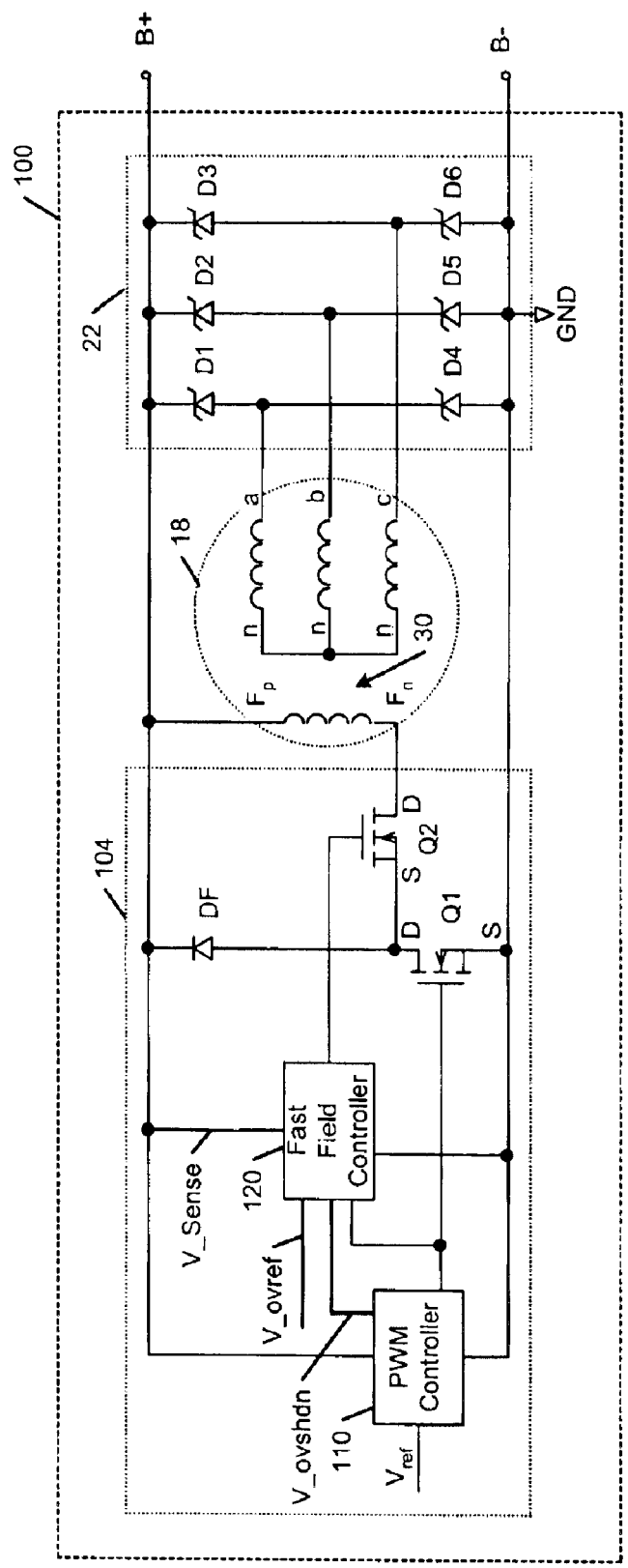
FIG. 4 is an electric power generator for a vehicle according to the present invention.

Referring now to FIG. 4, a generator 100 includes a field regulator 104 according to the present invention that is capable of fast turn-off of the field current during load dump transients. The generator 100 further includes the Lundell alternator 18, the 3-phase avalanche bridge rectifier 22, and a transistor Q2. A drain of the transistor 02 is connected to a $F_n$ terminal of the field winding 30. A power source is connected to the source of transistor Q1 and to the cathode of the diode DF.

The breakdown voltage of the transistors Q1, Q2 and the diode DF are greater than or equal to the rated voltage $V_{peak}$ of the generator 100. Under normal operating conditions, the transistor Q1 is turned on and off by an output of a PWM controller 110 while the transistor Q2 is on. During a load dump, a terminal voltage of the generator 100 exceeds an overvoltage refence ($V_{ovref}$). During the load dump, a fast field controller or overvoltage detection circuit 120 transmits a shutdown signal ($V_{ovshdn}$) to the PWM controller 110 to turn-off the transistor Q1 and the transistor Q2. The transistor Q2 acts as an avalanche diode in series with the field winding 30. The diode DF provides a path for the energy stored in the field winding 30 to decay.

The field winding 30 is subjected to a reverse voltage that is equal to the avalanche breakdown voltage of the transistor Q2. The field current decays to zero much more rapidly and reduces the duration of the load dump transient. After the field current is reduced to zero, additional time elapses before the terminal voltage reaches the nominal voltage $V_{nom}$ level due to eddy currents in the rotor of the Lundell alternator 18. When the terminal voltage falls below $V_{max}$, the $V_{ovshdn}$ signal is returned to an inactive state. The PWM controller 110 turns on the transistors Q1 and Q2.

Figure 5:
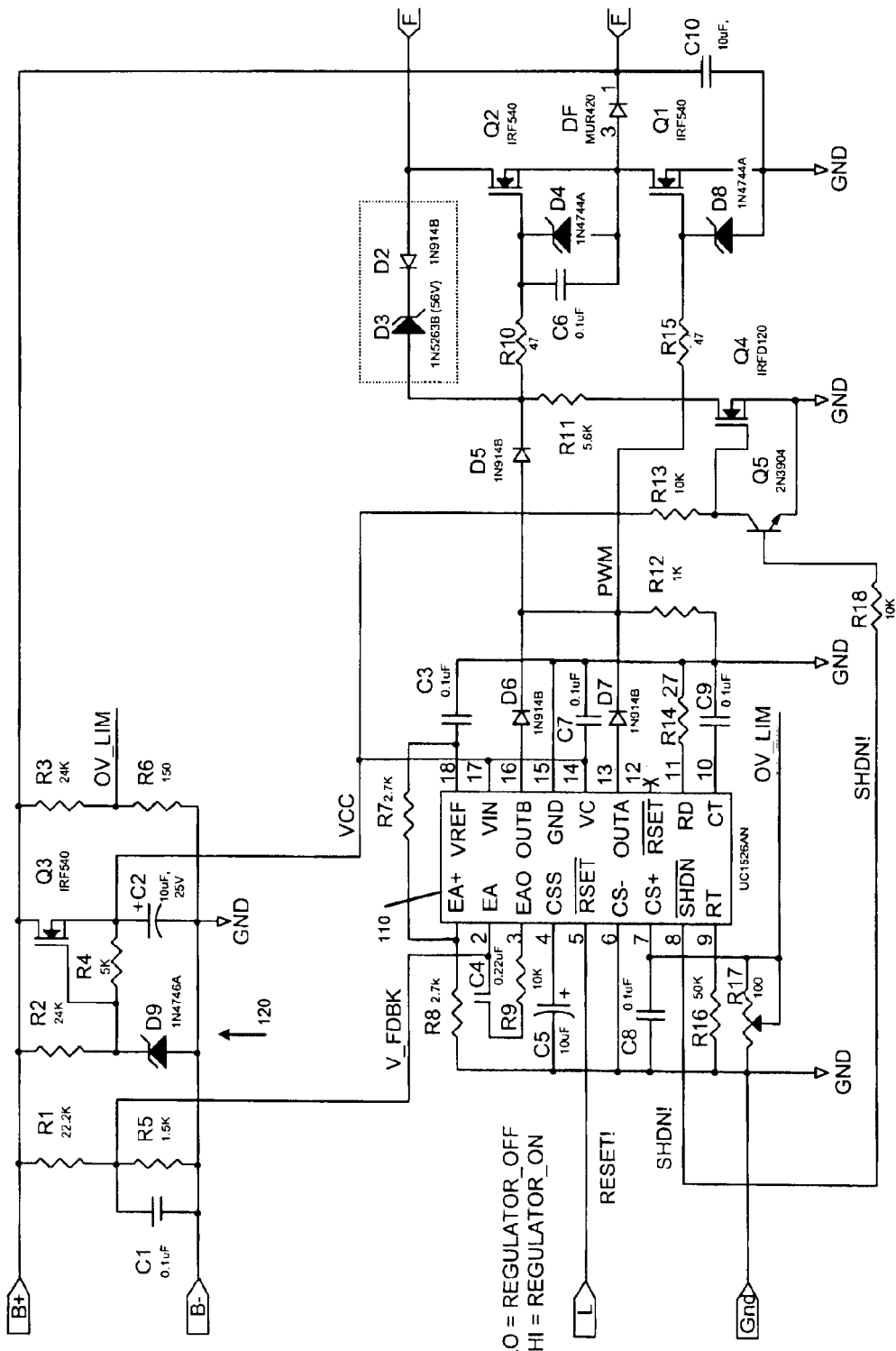
FIG. 5 is an exemplary implementation of the electric power generator of FIG. 4.

Referring now to FIG. 5, an exemplary implementation of the above control logic and overvoltage control for the generator during a load dump transient is shown. B+ and B− terminals of the field regulator are connected to the battery/generator positive and negative terminals, respectively. A junction of resistors R1 and R5 provides a scaled down voltage signal $V_{FDBK}$, which is proportional to the generator terminal voltage. Capacitor C1 provides high frequency noise filtering for $V_{FDBK}$.

A junction of resistors R3 and R6 provides another scaled down voltage signal OV_LIM, which is proportional to the generator terminal voltage that is used for triggering the over-voltage shutdown circuit. A linear regulator 120 includes resistor R2, diode D9, transistor Q3, resistor R4, and capacitor C2, which provide a bias voltage $V_{CC}$ to the PWM controller 110. The PWM controller 110 can be a standard PWM control IC UC1526AN made by Texas Instruments, although other controllers can be used.

Resistors R7 and R8 set a reference voltage for an error amplifier within the PWM controller 110 to control the generator terminal voltage during steady state conditions. The $V_{FDBK}$ signal is connected to the error amplifier. Resistor R9 and capacitor C4 provide proportional-integral (PI) compensator for the error amplifier in the PWM controller 110 closed loop control.

An over-current sense input CS+ is connected to the OV_LIM signal, which is calibrated using resistor R17 to generate the shutdown signal SHDN! at a preset generator terminal voltage. Resistors R16 and capacitor C9 set a PWM frequency of the regulator to approximately 350 Hz. The 2-phase outputs of the PWM controller 110 (OUTA, OUTB) are combined using diodes D6, D7 and resistor R12 to achieve a 0 to 95% maximum duty cycle PWM signal, which drives the gates of the transistors Q1 and Q2. Under normal operating conditions, the error amplifier adjusts the PWM duty cycle to control the average current through the field terminals $F_p$–$F_n$, which matches the generator terminal voltage to the reference voltage.

A drive scheme according to the invention maintains the transistor Q2 continuously on under normal operating conditions while transistor Q1 is switched on and off with the PWM signal. When the PWM signal goes high for the first time, the transistor Q1 is turned on via resistor R15. With a few microseconds delay, the transistor Q2 is turned on via diode D5, resistor R10, capacitor C6, and the transistor Q1. When the transistor Q1 turns off at the end of on time of the PWM signal, the voltage at the junction of drain of the transistor Q1 and the source of the transistor Q2 rises above that of the $F_p$ or B+ terminal, reverse biasing the diode D5 and forward biasing the diode DF. The gate-source charge required to maintain the transistor Q2 on is now supplied by the capacitor C6, which is sized appropriately. Thus, the field current free-wheels through the transistor Q2 and the diode DF until the transistor Q1 is turned on again when the diode DF turns off, and the capacitor C6 is recharged.

During a full load-dump, when the rectified generator voltage exceeds the pre-set overvoltage limit, the SHDN! signal goes low. As a result, the transistor Q1 is turned off by returning the PWM output to the low state. The transistor Q2 is turned off by discharging the capacitor C6, via resistors R10, R11 and the transistors Q4, Q1 (body diode).

The field current charges the drain-source capacitance of the transistor Q2 until it exceeds the breakdown voltage of the device. The field current decays rapidly through the transistor Q2 (operating as a zener diode) and the diode DF. When the field current reaches a level low enough for the generator terminal voltage to drop below the overvoltage limit (by an amount dictated by the hysteresis built into the comparator), the SHDN! signal returns to the high state. The transistor Q5 is turned on and the transistor Q4 is turned off. When the generator terminal voltage falls below the reference level, due to decreasing field current, the error amplifier generates the PWM pulses again to modulate the transistor Q1 and to keep the transistor Q2 on, maintaining the rectified generator voltage at the pre-set level.

The breakdown voltage of the transistor Q2 dictates the fall time of the field current, the load-dump over-voltage duration, and the energy dissipated in the avalanche rectifier bridge 22 at the generator output. The reverse voltage applied for fast field current reduction can be actively controlled using an active clamp circuit including diodes D2, D3 between the drain of the transistor Q2 and the junction of the resistors R10, R11. The applied reverse voltage across field terminals with the active clamp circuit will be the sum of the zener voltage of the diode D3, the forward drop of the diode D2, the threshold voltage of the transistor Q2, and the forward drop of the diode DF (i.e., $V_{z\_D3}+V_{f\_D2}+V_{th\_Q2}+V_{f\_DF}$). By applying a highe reverse voltage than the generator rectified voltage, the field current can be reduced faster, thereby reducing the over-voltage duration during full-load dump.

Figure 6:
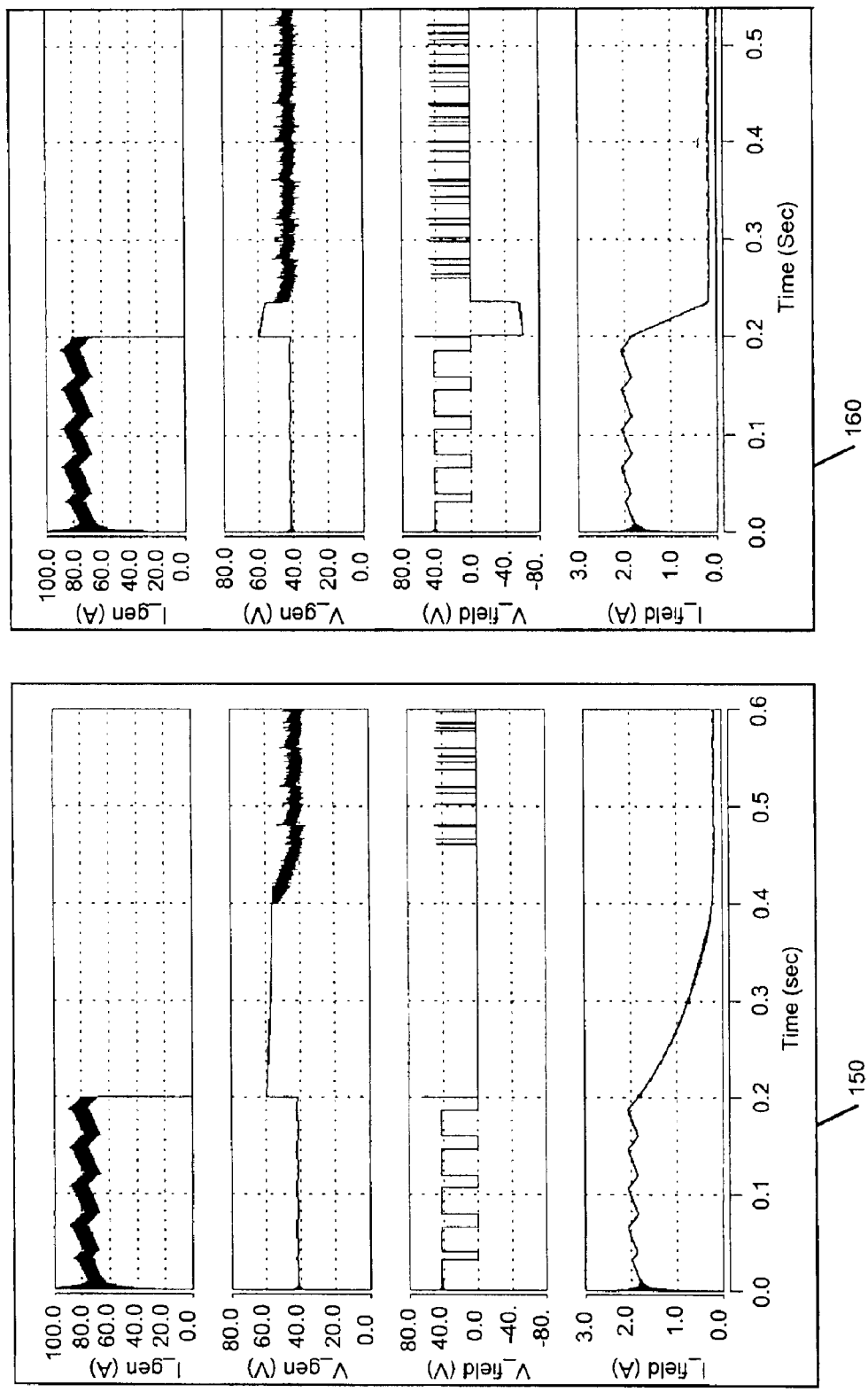
FIGS. 6 and 7 are waveforms comparing the operation of the electric power generators of FIGS. 1 and 4.
Figure 7:
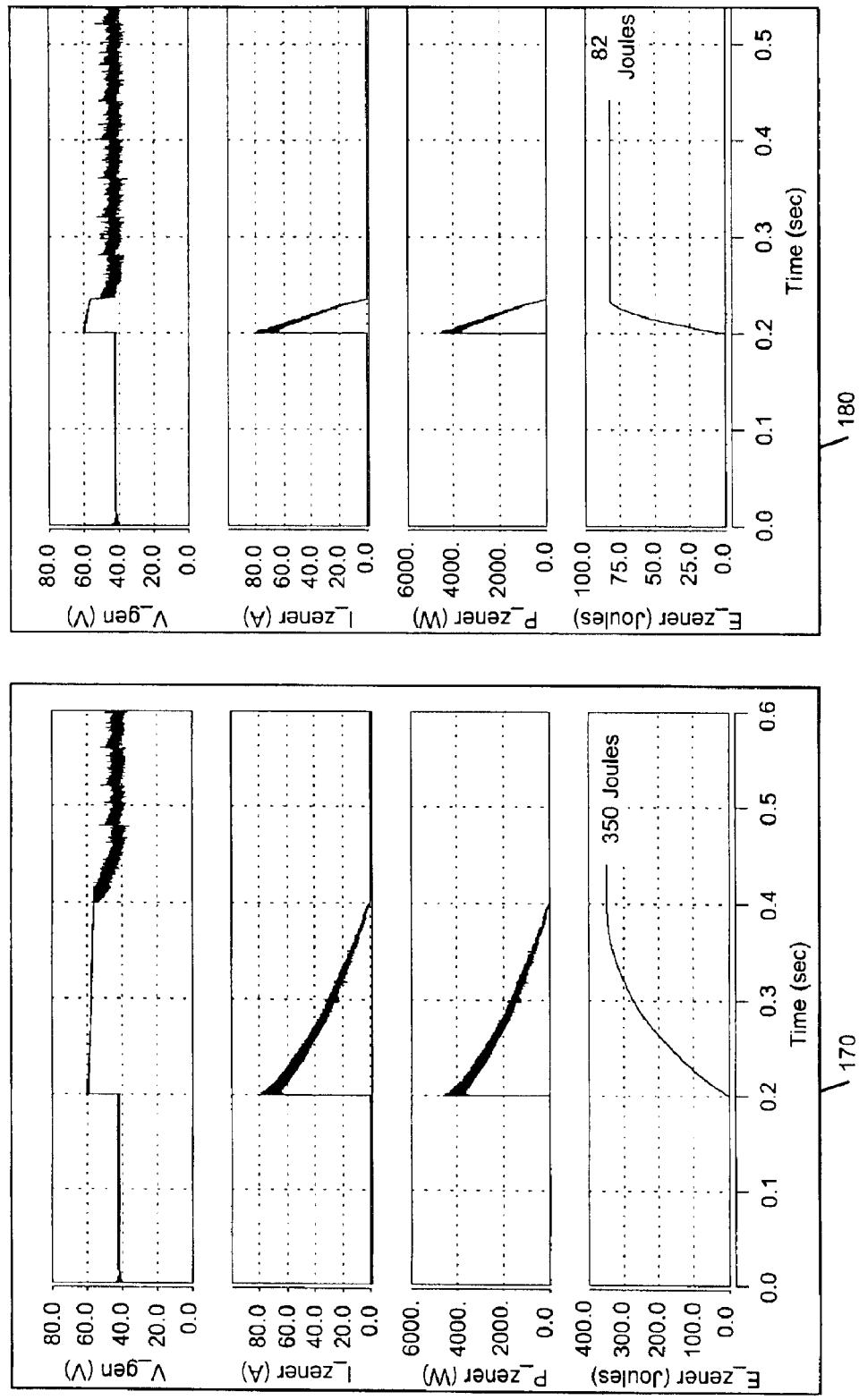

Referring now to FIG. 6, simulation results of the generator load dump response (load current (I_gen(A)), output voltage (V_gen(V)), field voltage (V_field(V)), and field current (I_field(A))) for the conventional field controller is shown at 150 and for the field controller 104 according to the present invention is shown at 160. Referring now to FIG. 7, simulation results during generator load dump for the conventional field controller is shown at 170 and for the field controller 104 according to the invention is shown at 180. The peak current (I_zener(A)), total power (P_zener(W)) and energy dissipated (E_zener(Joules)) in the avalanche rectifier at the output of the generator are shown. The load dump over-voltage duration and the energy dissipated in the avalanche rectifier are reduced by more than a factor of 4 with the field controller 104 according to the present invention.

The reduction in energy dissipated in the avalanche rectifiers during load dump results in lower junction temperature rise, which reduces possible failure due to overheating. Lower energy, lower cost diodes can be used or the reliability of the generator can be improved significantly against load dump failures. Another advantage of this scheme is to provide redundancy in the field control system. When a shorted transistor Q1 occurs (that might result in a battery over-voltage), the transistor Q2 can still interrupt the field current and prevent battery damage.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A generator field regulator circuit that communicates with a field winding of a Lundell machine, comprising:
   a first transistor;
   a second transistor having a source that communicates with a drain of said first transistor and a drain that communicates with one end of said field winding; and
   a free-wheeling diode that communicates with said drain of said first transistor and a source of said second transistor.

2. The generator field regulator circuit of claim 1 further comprising:
   an overvoltage detection circuit that modulates a gate of said second transistor.

3. The generator field regulator circuit of claim 2 further comprising:
   a pulse width modulation (PWM) circuit that modulates a gate of said first transistor to maintain generator rectified voltage at a nominal level.

4. The generator field regulator circuit of claim 3 wherein said overvoltage detection circuit outputs an overvoltage shutdown signal to said PWM circuit during a full-load dump mode to turn off said first transistor and said second transistor.

5. The generator field regulator circuit of claim 4 wherein said generator field regulator circuit is implemented in a generator, and wherein said overvoltage shutdown signal is disabled when a terminal voltage of said generator falls below a predetermined voltage.

6. The generator field regulator circuit of claim 4 further comprising first and second diodes that communicate with a drain of said second transistor and that set a clamp voltage of said second transistor when said overvoltage shutdown signal is enabled.

7. The generator field regulator circuit of claim 5 wherein said generator further includes:
   a Lundell machine that includes said field winding; and
   a 3-phase avalanche rectifier that communicates with said Lundell machine.

8. The generator field regulator circuit of claim 2 wherein said gate of said second transistor communicates with a cathode of a third diode and one end of a first capacitor, and wherein said third diode and said first capacitor keep said second transistor on during normal operation.

9. The generator field regulator circuit of claim 5 wherein an overvoltage shutdown signal threshold exceeds a maximum operating voltage of said generator.

10. The generator field regulator circuit of claim 5 wherein said second transistor and said overvoltage detection circuit are maintained at a lower temperature than an ambient temperature of other components of said generator.

11. A generator assembly, comprising:
    a field regulator circuit including a first transistor, a second transistor, an overvoltage detection circuit that modulates a gate of said second transistor; and that maintains said second transistor in an on state during a normal operating mode, and a pulse width modulation (PWM) circuit that modulates a gate of said first transistor to maintain generator rectified voltage at a nominal level;
    a Lundell machine having a field winding that communicates with said field regulator circuit; and
    a three-phase avalanche bridge rectifier that communicates with said Lundell machine.

12. The generator assembly of claim 11 wherein said second transistor has a drain that communicates with one end of said field winding, said first transistor has a drain that communicates with a source of said second transistor.

13. The generator assembly of claim 12 further comprising a free-wheeling diode that communicates with said drain of said first transistor and a source of said second transistor.

14. The generator assembly of claim 11 wherein said overvoltage detection circuit outputs an overvoltage shutdown signal to said PWM circuit during a full-load dump mode to turn off said first transistor and said second transistor.

15. The generator assembly of claim 14 wherein said overvoltage shutdown signal is disabled when a terminal voltage of said generator falls below a predetermined voltage.

16. The generator assembly of claim 14 further comprising first and second diodes that communicate with a drain of said first transistor and that set a clamp voltage of said second transistor when said overvoltage shutdown signal is enabled.

17. The generator assembly of claim 11 wherein said gate of said first transistor communicates with a cathode of a third diode and one end of a first capacitor, and wherein said third diode and said first capacitor keep said second transistor on during normal operation.

18. The generator assembly of claim 15 wherein an overvoltage shutdown signal threshold exceeds a maximum operating voltage of said generator.

19. The generator assembly of claim 11 wherein said overvoltage detection circuit and said second transistor are maintained at a lower voltage than an ambient temperature of other components of said generator.

20. A generator assembly, comprising:
    a field regulator circuit including a first transistor, a second transistor, an overvoltage detection circuit that modulates a gate of said second transistor and that maintains said second transistor in an on state during a normal operating mode, a pulse width modulation (PWM) circuit that modulates a gate of said first transistor to maintain generator rectified voltage at a nominal level, wherein said second transistor has a drain that communicates with one end of said field winding and said first transistor has a drain that communicates with a source of said second transistor, and a free-wheeling diode that communicates with said drain of said first transistor and a source of said second transistor;

a Lundell machine having a field winding that communicates communication with said field regulator circuit; and a three-phase avalanche bridge rectifier that communicates with said Lundell machine, wherein said overvoltage detection circuit outputs an overvoltage shutdown signal to said PWM circuit during a full-load dump mode to turn off said first transistor, which turns off said second transistor.

* * * * *